United States Patent [19]

Wheat et al.

[11] Patent Number: 5,000,339
[45] Date of Patent: Mar. 19, 1991

[54] FLIP-TOP GAS CAP

[76] Inventors: Richard Wheat, 2151 N. Meridian Rd., #22, Apache Junction, Ariz. 85220; William Thornton, 1224 E. Evergreen, Apt. 113, Mesa, Ariz. 85203

[21] Appl. No.: 415,633

[22] Filed: Oct. 2, 1989

[51] Int. Cl.[5] .............................................. B65D 51/16
[52] U.S. Cl. ................................... 220/203; 220/202; 220/210; 220/303; 220/DIG. 33
[58] Field of Search ............... 220/202, 203, 204, 208, 220/210, 255, 256, 259, 303, DIG. 33, 86 R

[56] References Cited

U.S. PATENT DOCUMENTS

| 1,534,836 | 4/1925 | Brede et al. | 220/210 |
|---|---|---|---|
| 1,689,979 | 10/1928 | Tate et al. | 220/210 X |
| 1,722,615 | 7/1929 | Widerberg | 220/210 X |
| 4,312,649 | 1/1982 | Fujii et al. | 220/DIG. 33 |
| 4,342,208 | 8/1982 | Evans | 220/210 X |
| 4,527,406 | 7/1985 | Baker | 220/210 X |

Primary Examiner—Stephen Marcus
Assistant Examiner—Nova Stucker
Attorney, Agent, or Firm—James F. Duffy

[57] ABSTRACT

A flip-top replacement gas cap for replacing conventional screw-on caps provided as original equipment with present day motor vehicles. Two embodiments of the invention are disclosed. The first is a manually actuated device. The second is a key actuated device. In both embodiments pressure relief valves are included to vent over-pressure within the gas tank and to bleed off pressure prior to opening of the flip-top cap. The key actuated emboidment includes a rachet cam assembly which permits the cap to be screw fastened to a motor vehicle gas filler vent but precludes the unscrewing of the cap thereafter. "Gas cap" is used herein as a generic descriptor for any closure cap used to seal a filler tube of a fuel tank or any other storage vessel.

11 Claims, 2 Drawing Sheets

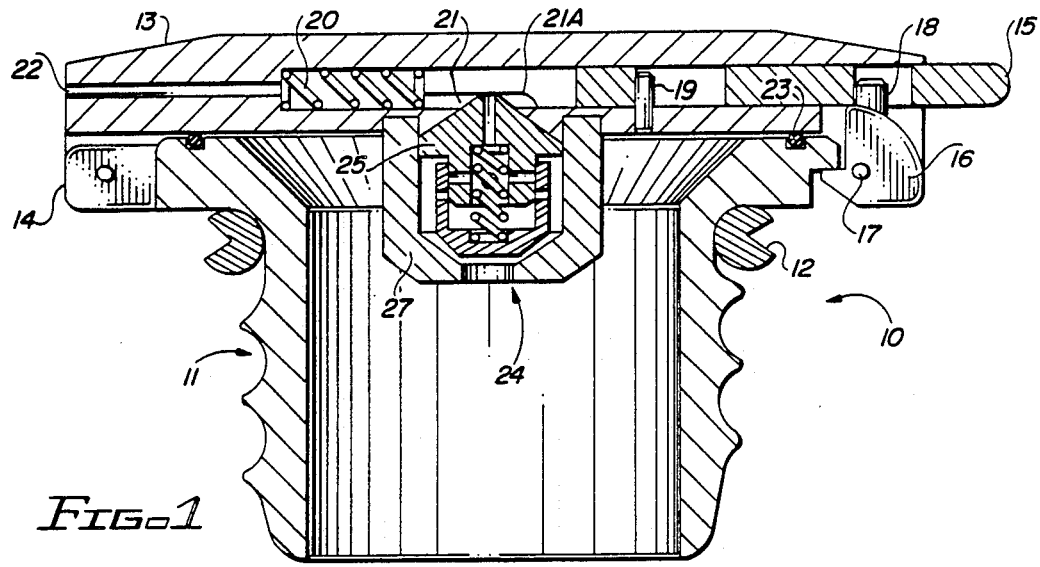
FIG-1
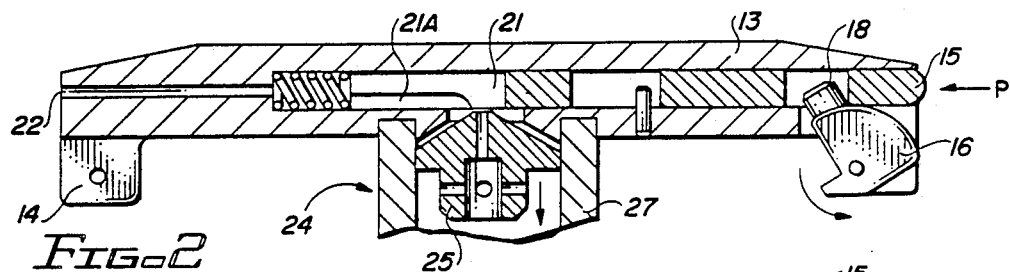
FIG-2
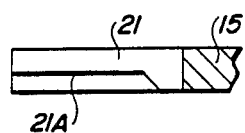
FIG-3A
FIG-3C
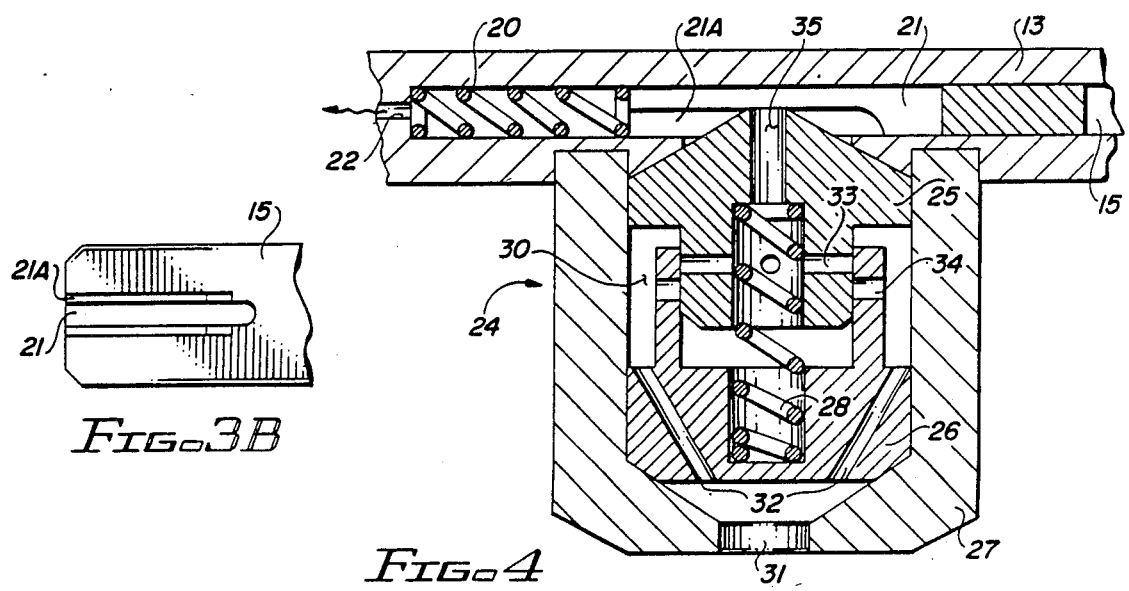
FIG-3B
FIG-4

FLIP-TOP GAS CAP

BACKGROUND

1. Field of the Invention

The invention relates to a replacement gas cap to replace the conventional screw-on gas cap found in most motor vehicles. The replacement cap flips open and may be manually or key actuated.

2. Prior Art

Motor vehicle gas tanks must be kept tightly capped to avoid the dangers of an explosive ignition of the gasoline within the tank and to prevent environmental harm due to the escape of gasoline vapors into the atmosphere. Each time a gas tank is replenished, the gas cap must be unscrewed at the start of the fueling operation and then screwed back into position at the end of the fueling operation. While the necessity to twist open and to twist on the cap is a minor inconvenience, which is overcome by the invention, a significant problem exists with the gas caps associated with newer motor vehicles. When these gas caps are tightened onto the filler vent tube of the gas tank, they reach a certain point at which an interior rachet is actuated and the cap may be twisted without further tightening it in position. This racheting arrangement prohibits the gas cap from being tightened so tight as to be difficult to remove.

Experience has shown that over a course of two or three years the racheting arrangement may wear out and it becomes difficult to emplace and remove the gas tank on the gas filler nozzle since the cap tends to turn freely about the threaded base of the cap.

It is the intent of the invention to not only overcome the inconvenience of having to twist loose and twist tight a gasoline cap but also to obviate the necessity of having to replace gas caps at relatively frequent intervals due to the wear and tear on the cap's interior racheting arrangement.

SUMMARY OF THE INVENTION

The invention disclosed and claimed herein is a flip-top replacement gas cap. The gas cap is made up of a hollow, cylindrical, screw threaded base for making a screw fastened coupling with the filler vent tube of a fuel tank. Hingedly coupled to the base is a flip-up cap which seals the base and the vent filler tube of the fuel tank when the base is installed on the tank. There are latching means which permit the cap to be releasedly and latchingly coupled to the base. The latching means may be selectedly positioned for latching and unlatching the cap in and from sealing relationship with the base.

Because the vapor pressure in a fuel tank cycles in accord with atmospheric temperatures, a pressure release assembly is coupled to the flip-up cap. Within the assembly a first pressure release valve will vent off excessive gaseous pressures which tend to build up within the fuel tank. Also, within the release assembly a second pressure release valve, functioning in cooperation with the latching mechanism of the flip-up cap, releases gas pressure from the tank in the course of unlatching the flip-up cap.

To prevent theft of the flip-up gas cap, rotatable coupling means, coupling the flip-up cap and the threaded base, are provided so that the cap is capable of rotating freely with respect to the base. The base and cap are then further coupled by a rachet coupling which limits the respective rotation between cap and base to a selected direction such that cap and base rotate in the same direction when being thread coupled to the filler vent of a fuel tank. Attempts thereafter to unscrew the assembly from the filler vent result in the cap freely rotating about the threaded base without unscrewing the threaded base from the filler vent.

To prevent theft of fuel from the tank, an embodiment of the invention is disclosed and claimed in which the cap is key actuated.

DESCRIPTION OF THE DRAWINGS

FIG. 1 is a sectional elevation view of the manually operated flip-top gas cap.

FIG. 2 is a partial sectional view of the flip-top gas cap showing the effect of manually actuating the release, slide lever.

FIGS. 3A, 3B and 3C illustrate, respectively, the side, bottom, and end view of the cap vent chamber and the means for actuating a pressure relief valve when the flip-top cap is actuated for release.

FIG. 4 is an enlarged detailed, cross sectional view of the pressure release assembly disclosed for use with the flip-top gas cap.

A DETAILED DESCRIPTION OF THE INVENTION

Figure 5:
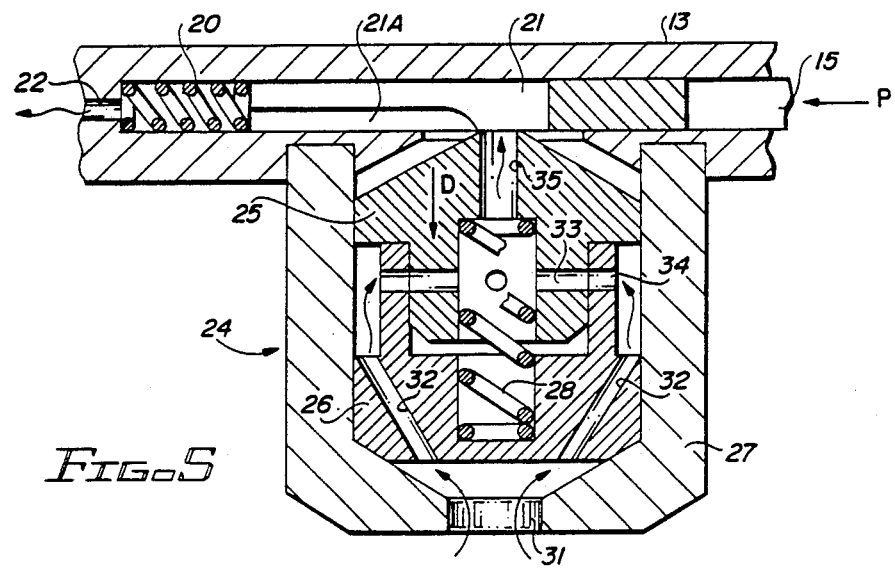
FIG. 5 is a similar cross sectional view showing the manner in which one of the pressure relief valves within the relief assembly of FIG. 4 is actuated in preparation for the flip-top cap being opened.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

The flip-top replacement gas cap 10 of the invention is illustrated in cross section in FIG. 1. The replacement cap is seen to comprise a screw-in base 11 with an associated O-ring seal 12. The use of such seals is well known in the prior art. The flip-top cap 13 is coupled to the screw-in base 11 by means of hinge 14. A slide bar 15 releases the spring loaded latch 16. Spring loaded latch 16 rotates about pivot 17 when slide bar 15 moves push pin 18 to the left of the illustration of FIG. 1.

A stop-limit pin 19 is positioned so as to prevent the extraction of slide bar 15 from cap 13. A spring 20 within flip-top cap 13 urges slide bar 15 in an outward direction, to the right as illustrated in FIG. 1, and against stop-limit pin 19.

Flip-top cap 13 is provided with an interior vent chamber 21 from which gases exhausted from the gas tank, not shown, exit the vent passage 22. An O-ring 23, interposed between screw base 11 and flip-top cap 13, assures that vapors from the gasoline tank will not otherwise leak out into the atmosphere. However, the build up of excessive gaseous pressures within the tank must be avoided and for this purpose a pressure relief assembly 24 is provided, coupled to the flip-top cap 13. The pressure release assembly 24 provides for release of pressure which builds up within the gas tank should this pressure build up to an excessive level. It also provides a valve to release any slight build up of pressure which may occur between openings of the gas cap. This slight build up of pressure is released when the slide bar 15 is actuated to open the flip-cap 13. The cross sectional view shown in FIG. 2 illustrates the actuation of slide bar 15 and its effect on the release valve 25 within assembly 24.

When slide bar 15 is pushed in the direction indicated by the arrow P, push pin 18 is caused to move in the same direction as arrow P which in turn causes spring loaded latch 16 to pivot about pivot 17 and to assume the position indicated in FIG. 2. Comparison of latch 16 in FIG. 1 and its newly assumed position in FIG. 2 will indicate that flip-top cap 13 may be readily lifted and pivoted about hinge 14.

Movement of slide bar 15 as indicated in FIG. 2 has a second effect. Within pressure release assembly 24 is a manually actuated pressure relief valve 25. As seen in FIG. 1, pressure relief valve 25 extends upward into vent chamber 21 where it makes an interfering contact with a sloping wall 21A. As is best seen in the side, bottom, and end views of vent chamber 21, illustrated in FIGS. 3A, 3B and 3C, respectively, the height of sloping side wall 21 within vent chamber 21 diminishes to the right side of all depictions of vent chamber 21 presented herein. The effect of this diminishment is to cause pressure release valve 25 to be depressed, see FIG. 2, downwardly within cylindrical embodiment 27 as slide bar 15 moves in the direction of arrow P. As will be disclosed shortly, this downward movement of release valve 25 results in a release of any pressure built up within the gas tank on which the flip-top gas cap 10 is utilized. To emphasize the manner in which release valve 25 is driven downwardly a comparison of FIGS. 1 and 2 is best undertaken.

As FIG. 1 best illustrates, release valve 25 is permitted to penetrate upward within vent chamber 21 because of the degree with which sloping wall 21 extends upward within the vent chamber. However, the extent to which sloping wall 21A extends upward diminishes to the right of the drawing and when slide bar 15 is pushed in the direction of arrow P in the manner depicted in FIG. 2, the fact that the sloping side wall 21A penetrates to a lesser degree within vent chamber 21 causes valve 25 to move downwardly as it maintains its contact with those sloping walls.

The details of pressure release assembly are shown in FIG. 4. A pair of pressure release valves 25 and 26 are housed within a cylindrical embodiment 27. Cylindrical embodiment 27 contains a gaseous pressure entry port 31. Gaseous vapors can enter through port 31 and travel upwardly through four vent passageways 32, two of which are seen in the illustration of FIG. 4, within tank over-pressure relief valve 26. Over-pressure relief valve 26 also contains four additional vent passageways 34.

In the disposition of parts illustrated in FIG. 4 gaseous vapors may not progress further than passageways 34 because the exits of these vent passageways are in intimate contact with the wall of cap opening, pressure release valve 25. Release valve 25 contains four vent passageways 33. These passageways communicate with a central vent release cavity 35 which, as will be shown is open ended into the atmosphere. As an examination of FIG. 4 indicates, no gaseous vapors may travel from gaseous pressure entry port 31 through to passage 35 unless and until vent passageways 33 in pressure relief valve 25 are caused to align with vent passageways 34 in relief valve 26. The relative positions of valves 25 and 26, maintaining vent passageways 33 and 34 in a non-aligned position, is produced by the action of spring 28 within central passageway 35 which exerts opposing forces on valves 25 and 26 to drive them away from each other to the limits defined by the assembly's constraints.

A first such alignment of vent passageways 33 and 34 is illustrated in FIG. 5. FIG. 5 is similar to FIG. 2 but contains more elements. Slide bar 15 has been driven in the direction of arrow P so as to compress spring 20. Spring 20 is provided to drive slide bar 15 back to its nominal operating position. The movement of slide bar 15 results in the downward depression of valve 25, as illustrated in FIG. 5 and as discussed earlier with respect to FIGS. 1 and 2. When valve 25 moves downward, as indicated by arrow D, the gaseous passageways 33 and 34 align and thus a path is provided from the gas tank through gaseous entry port 31 and gaseous passageways 32, 34, 33 and central vent passage 35. The passage of gaseous vapors is indicated by the wavy arrows. Gaseous vapors enter vent chamber 21 and pass out vent passageway 22 to the atmosphere. Since vent chamber 21 is maintained at environmental air pressure by reason of vent passage 22 being always in communication with that atmosphere, central gaseous passageway 35 is also always maintained at atmospheric pressure.

The illustration of FIG. 5 shows the relative positions assumed by pressure release valves 25 and 26 when slide bar 15 is depressed in the direction of the arrow P. Slide bar 15 is so depressed preparatory to opening flip-top cap 13. So pressing slide bar 15 causes release valve 25 to move downwardly to align gaseous passages 33 and 34 and permit any build up of pressure within the gas tank to be dissipated before flip-top cap 13 is opened.

Figure 6:
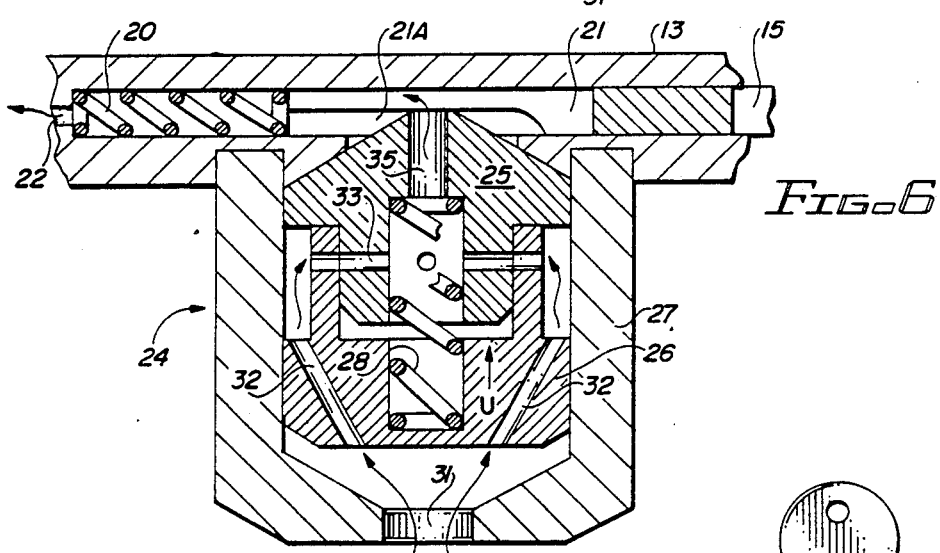
FIG. 6 is a similar enlarged detailed cross section showing the manner in which a build up of pressure within the gas tank causes one of the pressure relief valves within the assembly to allow the excess pressure to bleed off from the tank.

The sectional assembly drawing of FIG. 6 presents valves 25 and 26 in a different aligning relationship than that of FIG. 5. In FIG. 6, the depressing pressure P has been released and spring 20 has caused slide bar 15 to assume its nominal position. With slide bar 15 in the position depicted, valve 25 extends upwardly to its maximum extent within vent chamber 21. However, an assumed build up of vapor pressure within the gas tank on which the flip-top cap 10 is utilized has caused valve 26 to move upwardly, overcoming the resistive force of spring 28, to bring vent passageways 33 and 34 again into alignment. So long as gas tank pressure is high enough to maintain valve 26 in its elevated position, as indicated by arrow U, passageways 33 and 34 will remain aligned and pressure will be released through passageways 32, 34, 33, 35, 21 and 22 in the manner earlier described.

In the embodiment of the invention just described, a flip-top gas cap has been disclosed which may be threadedly inserted into the filler pipe of an automotive gas tank. The ease with which the gas cap may be opened will recommend it to many users as a replacement for the screw-type gas cap which is provided as original equipment on the vehicle. However, the fact that most modern vehicles are provided with a cam racheting arrangement in the cap that is screwed to the gas tank filler vent has resulted in a necessity to replace these racheting type gas caps after two or three years of service because of failure of the racheting mechanism which basically consists of displaceable plastic cams which will distort when a selected twist force level is exceeded so as to cause the cap to continue rotation while the base remains stationary. This arrangement is provided in modern vehicles to prevent an over tightening of the screw type cap to the tank filler vent.

Figure 7:
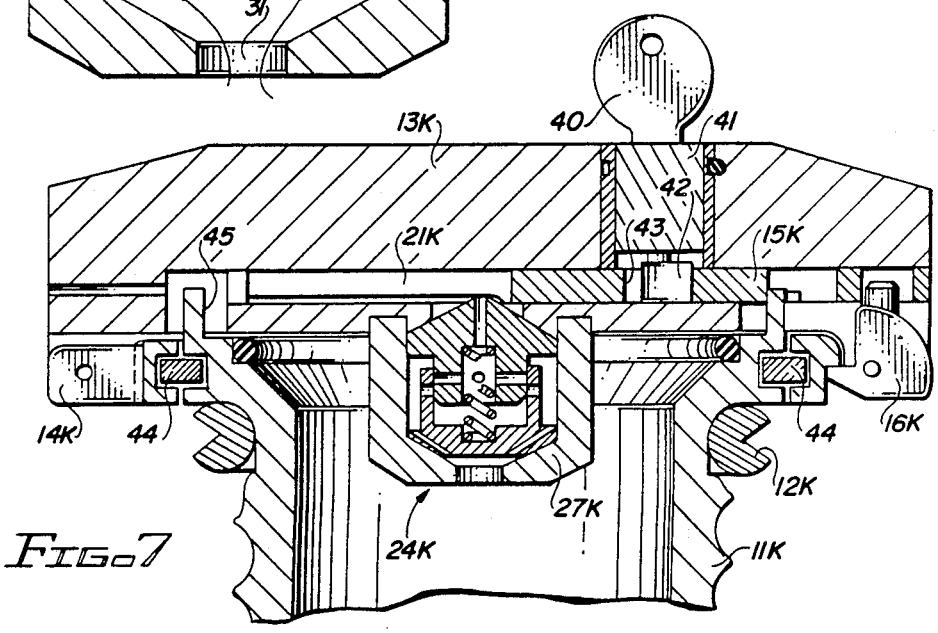
FIG. 7 is a second embodiment of the invention shown in cross section. In this embodiment the flip cap is key actuated and the cap and its threaded base are rotatingly coupled to permit positioning of the key cylinder in a convenient position when atop the cap.

As with any thread coupled gas cap, the flip-top gas cap in the embodiment of the invention as just disclosed, is subject to theft and the fuel within the tank subject to syphoning. To inhibit such theft, a second embodiment of the invention is here briefly disclosed which contains a key locking mechanism to prevent the unauthorized opening of the cap and a cam racheting arrangement, similar to that employed with present day vehicles, but which rachets freely when the flip-top gas cap is rotated in an attempt to unscrew the threaded base from the gas tank filler vent. The key lock/racheting embodiment of the invention is illustrated in FIG. 7. All reference numerals which are followed by K indicate elements of the embodiment which perform the same function as those elements of the earlier invention referenced without the letter K.

Key 40 actuates key cylinder 41 which is coupled to a flip-top cap 13K. Coupled for key actuation to cylinder 41 is a cylindrical cam 42. Cam 42 is driven off-axis and rides within slot 43 of slide bar 15K. Because of the off-set, eccentric rotation of cam 42 when key 40 is rotated, cam 42 will contact either the left or the right wall of slot 43, in the illustration of FIG. 7. Thus, rotating key 40 will rotate cam 42 to drive slide bar 15K either to the left or the right of the illustration. As shown in FIG. 7, the key has positioned cam 42 to maintain flip-top cap 13K in a locked position. Rotation of key 40 so as to cause cam 42 to move slide bar 15K to the left results in a configuration similar to that depicted in FIG. 2 wherein latch 16K is rotated to permit opening of flip-top cap 13K and pressure release assembly has been actuated to draw off gas tank pressure prior to the opening of flip-top cap 13K.

Flip-top cap 13K is rotatingly coupled to threaded base 11K by means of clip ring 44. The use of clip rings to achieve such a rotatable coupling is well known to those skilled in the art. To inhibit the direction in which cap 13 may rotate with respect to threaded base 11, a cam racheting coupling 45 is interposed between threaded base 11K and cap 13K. This cam racheting coupling 45 is similar to that utilized in present day motor vehicles to prevent over tightening of the threaded gas cap to the tank filler vent. However, in the present invention, the cam racheting coupling 45 is oriented to permit threaded base 11K to be tightened as securely as possible to the gas tank filler vent. It is only when one attempts to extract threaded base 11K from the tank filler vent that the racheting assembly 45 permits cap 13K to rotate relatively freely about threaded base 11K so as to prevent base 11K from being decoupled from the gas tank filler cap. Thus, cam racheting assembly 45 acts in a manner as to permit the driving of base 11K into secure threaded coupling with a gas tank filler vent while preventing the withdrawal of that threaded base from the filler vent by permitting cap 13K to rotate freely about the base if an attempt is made to unscrew the base from the filler vent.

What has been described is a flip-top replacement gas cap for replacing conventional screw-on caps provided as original equipment with present day motor vehicles. Two embodiments of the invention are disclosed. The first is a manually actuated device. The second is a key actuated device. In both embodiments pressure relief valves are included to vent over-pressure within the gas tank and to bleed off pressure prior to opening of the flip-top cap. The key actuated embodiment includes a rachet cam assembly which permits the cap to be screw fastened to a motor vehicle gas filler vent but precludes the unscrewing of the cap thereafter. "Gas cap" is used herein as a generic descriptor for any closure cap used to seal a filler tube of a fuel tank or any other storage vessel.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. A flip-top replacement gas cap comprising:
   a hollow-cylindrical screw threaded base for making a screw fastened coupling with the filler vent tube of a gasoline tank;
   a flip-up cap hingedly coupled to said base for sealing said base once said base is installed on a gasoline tank;
   latching means releasedly latchingly coupling said flip-up cap and said base for selectedly latching and unlatching said flip-up cap in and from sealing relationship with said base;
   a pressure release assembly coupled to said flip-up cap;
   wherein said pressure release assembly comprises:
   a first pressure release means for venting excessive gaseous fuel vapor pressures to relieve pressure build-up in a fuel tank; and
   a second pressure release means for venting gaseous fuel vapor pressures as said flip-up cap is being unlatched.

2. The gas cap of claim 1 further comprising latch release means coupled to said flip-up cap and said latching means for operatively positioning said latching means to latch and unlatch said flip-up cap.

3. The gas cap of claim 1 further comprising rotatable coupling means coupling said flip-up cap and said base whereby said flip-up cap may be rotated with respect to said base.

4. The gas cap of claim 1 further comprising rotation limiting rachet coupling means coupling said flip-up cap and said base for limiting to a selected direction the rotation of said flip-up cap with respect to said base.

5. A flip-top replacement gas cap comprising:
   a hollow-cylindrical screw threaded base for making a screw fastened coupling with the filler vent tube of a gasoline tank;
   a flip-up cap hingedly coupled to said base for sealing said base once said base is installed on a gasoline tank;
   latching means releasedly latchingly coupling said flip-up cap and said base for selectedly latching and unlatching said flip-up cap in and from sealing relationship with said base;

a pressure release assembly coupled to said flip-up cap;

wherein said pressure release assembly comprises pressure release means for venting gaseous fuel vapor pressures as said flip-up cap is being unlatched said pressure release means being coupled to said latching means for actuation by said latching means as said flip-up cap is unlatched.

6. The gas cap of claim 5 further comprising rotatable coupling means coupling said flip-up cap and said base whereby said flip-up cap may be rotated with respect to said base.

7. The gas cap of claim 6 further comprising rotation limiting rachet coupling means coupling said flip-up cap and said base for limiting to a selected direction the rotation of said flip-up cap with respect to said base.

8. A flip-top replacement gas cap comprising:

a hollow-cylindrical screw threaded base for making a screw fastened coupling with the filler vent tube of a gasoline tank;

a flip-up cap hingedly coupled to said base for sealing said base once said base is installed on a gasoline tank;

latching means releasedly latchingly coupling said flip-up cap and said base for selectedly latching and unlatching said flip-up cap in and from sealing relationship with said base; and rotatable coupling means coupling said flip-up cap and said base whereby said flip-up cap may be rotated with respect to said base.

9. The gas cap of claim 8 further comprising rotation limiting rachet coupling means coupling said flip-up cap and said base for limiting to a selected direction the rotation of said flip-up cap with respect to said base.

10. The gas cap of claim 8 further comprising a key removably coupled to said flip-up cap and said latching means for key actuation of said latching means.

11. The gas cap of claim 10 further comprising rotation limiting rachet coupling means coupling said flip-up cap and said base for limiting to a selected direction the rotation of said flip-up cap with respect to said base.

* * * * *